J. P. ST. JOHN.
HAND COVERING.
APPLICATION FILED AUG. 30, 1915.

1,179,871.

Patented Apr. 18, 1916.

Inventor
James P. St John
by Seymour Reavee
Atty.

UNITED STATES PATENT OFFICE.

JAMES P. ST. JOHN, OF NEW HAVEN, CONNECTICUT.

HAND-COVERING.

1,179,871.   Specification of Letters Patent.   Patented Apr. 18, 1916.

Application filed August 30, 1915. Serial No. 47,923.

*To all whom it may concern:*

Be it known that I, JAMES P. ST. JOHN, a citizen of the United States, residing at New Haven, in the county of New Haven and State of Connecticut, have invented a new and useful Improvement in Hand-Coverings; and I do hereby declare the following, when taken in connection with the accompanying drawings and the characters of reference marked thereon, to be a full, clear, and exact description of the same, and which said drawings constitute part of this application, and represent, in—

Figure 1:
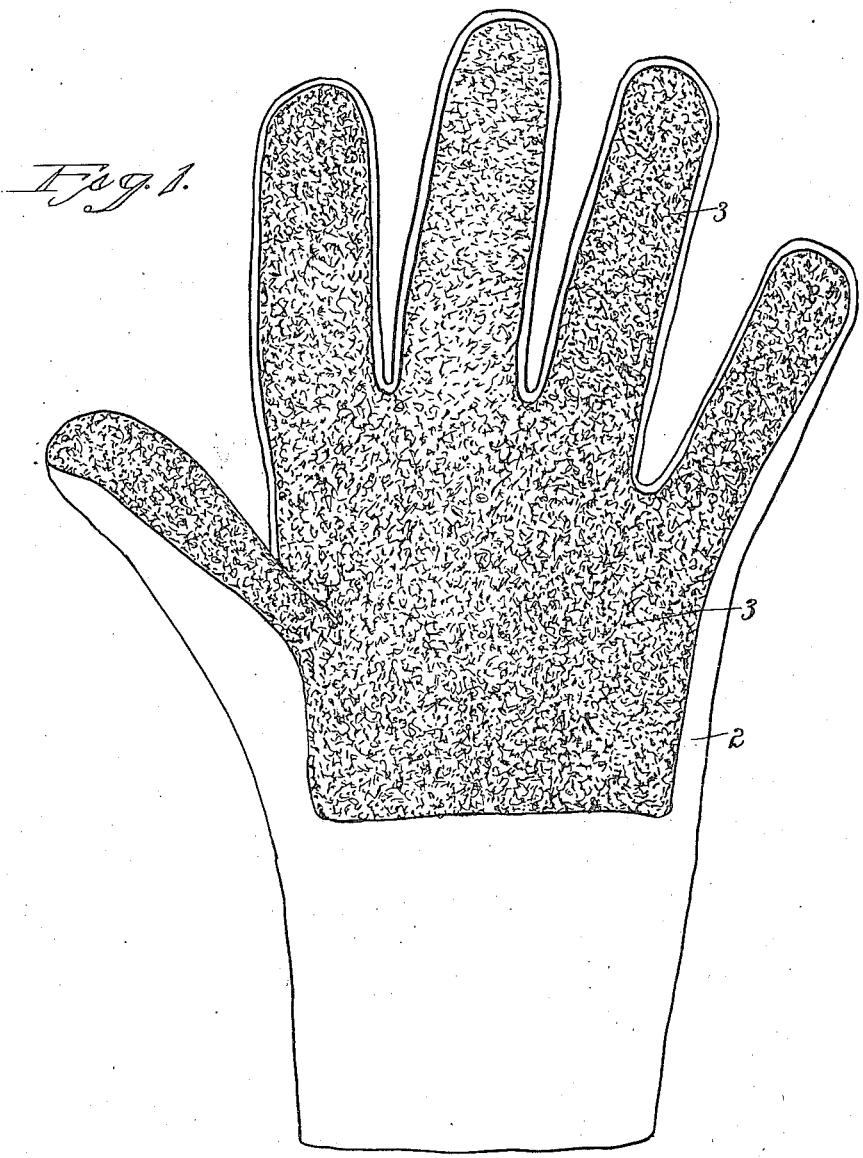
Figure 2:
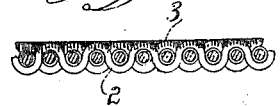

Figure 1 a face view of a hand covering illustrating my invention. Fig. 2 a broken enlarged sectional view in the nature of a diagram illustrating the application of a gripping surface to a fabric hand covering.

This invention relates to an improvement in hand coverings, either a glove or a mitten, and particularly to hand coverings formed from fabric.

The particular object of this invention is to provide a fabric hand covering, with a gripping surface so as to adapt such hand coverings for the use of drivers of automobiles. In operating an automobile with a glove the hand is apt to slip upon the wheel.

In illustrating my invention I have shown it as applied to a glove, but it will be evident that it might be applied to a mitten in the same way. The surface of the glove or mitten, 2, is coated with a wearing surface, 3. This coating is a rubber composition formed principally of rubber gum and rubber cement, which is applied to the inner surface of the hand covering. In practice, the covering is placed upon a form and the desired surface coated with the rubber preparation, vhich is then subjected to sufficient pressure to force the rubber compound into the body of the covering, although not necessarily entirely through it, and the covering is then subjected to sufficient heat to vulcanize the rubber compound. A hand covering thus treated is not sticky in the sense of being gum-like, but tends to adhere or grip a surface, and thus prevents slipping and allows the operator to obtain a firm grip.

It is obvious that any suitable pigment may be mixed with the rubber composition to give any color which may be desired. This rubber coating is so thin and is so impregnated with the fabric as to be flexible, so as not to interfere with the movement of the hands.

I claim:—

A hand covering formed from textile fabric having the palm surface and finger portions impregnated solely with a rubber composition constituting a wearing surface therefor.

JAMES P. ST. JOHN.